June 4, 1940.  D'ARCY A. YOUNG, JR  2,203,660
OBJECTIVE MOUNT
Filed Nov. 8, 1938
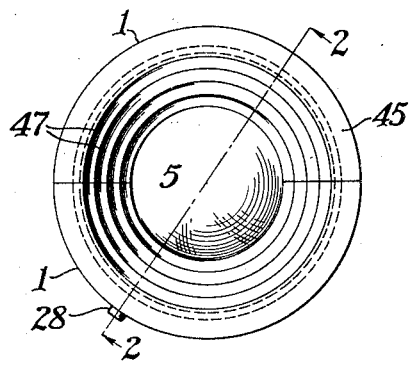
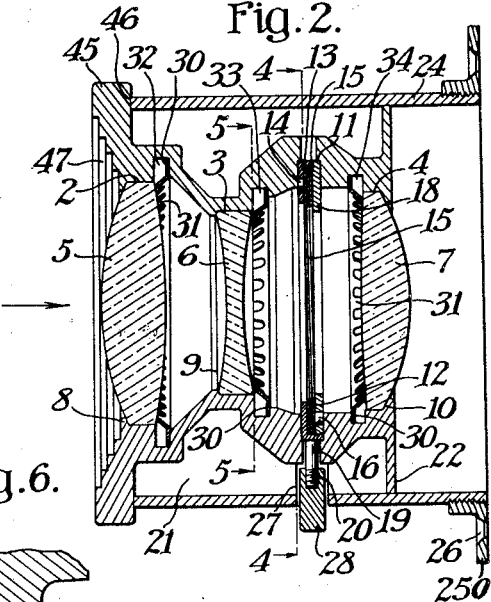
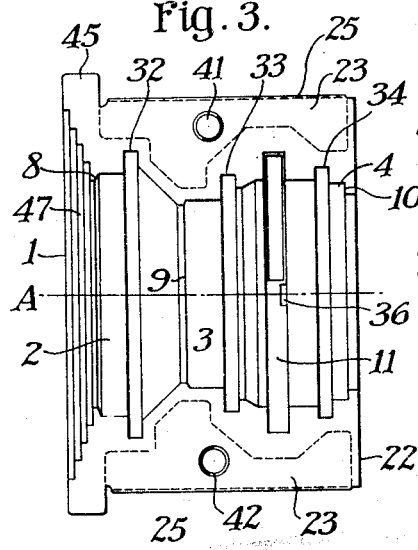
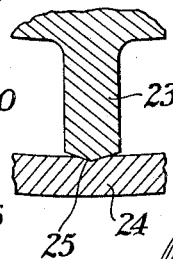
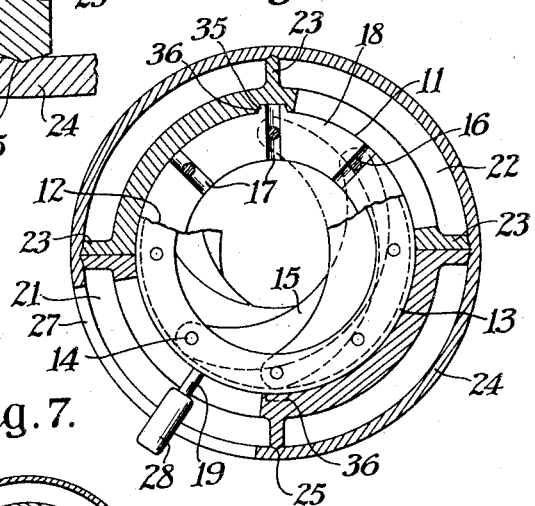
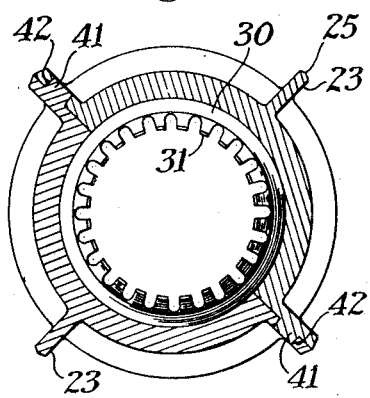
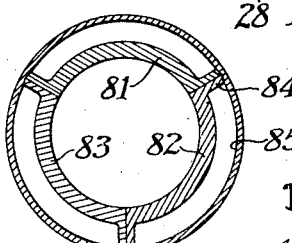
Inventor
D'Arcy A. Young Jr
By
Attorneys Patented June 4, 1940

2,203,660

UNITED STATES PATENT OFFICE 2,203,660

OBJECTIVE MOUNT

D'Arcy A. Young, Jr., Rochester, N. Y., assignor to Eastman Kodak Company, Rochester, N. Y., a corporation of New Jersey Application November 8, 1938, Serial No. 239,535

12 Claims. (Cl. 88—57)

This invention relates to photography and more particularly to mounts for photographic objectives.

One object of my invention is to provide an inexpensive lens mount which is simple in construction and into which lens elements can be rapidly and accurately assembled. Another object of my invention is to provide a lens mount which can be made of relatively simple die-cast parts. Still another object of my invention is to provide a lens mount in which the elements are held in an assembled position in two or more separable parts, these parts being in turn held in lens retaining position by means of a simple tubular member having a telescoping relation therewith. A still further object of my invention is to provide a simple form of objective mount in which the lens elements and diaphragm can be separately assembled, the assembled parts being finally held in the proper relationship by means of a tubular member, and other objects will appear from the following specification, the novel features being particularly pointed out in the claims at the end thereof.

The cost of photographic objectives which may be used for taking or projecting images has in the past been a very considerable cost of the camera or projector on which such objectives are used largely because in order to mount the lens elements accurately, it has been necessary to have a great deal of hand labor by skilled mechanics to provide the necessary cells and barrel with the various screw-threaded connections which have been deemed necessary. With certain types of objectives, the mount for the several lenses has been more expensive than the cost of the glass lens elements so that by reducing materially the cost of the objective mount, a very material saving can be made in the cost of an entire objective.

In accordance with my invention, I have provided a mount into which the various lenses may be readily assembled by hand, the several parts of the mount of which can be readily made by die-casting or by other suitable means. The cost of assembly of such an objective is much less than that of objectives heretofore used.

Coming now to the drawing wherein like reference characters denote like parts throughout:

Fig. 1 is a front elevation of an objective mount constructed in accordance with and embodying a preferred form of my invention.

Fig. 2 is an enlarged section taken on line 2—2 of Fig. 1.

Fig. 3 is a plan view of one of the semi-cylindrical members into which the lens elements may be assembled.

Fig. 4 is a section on line 4—4 of Fig. 2, showing a preferred form of diaphragm construction which may be used with my improved lens mount.

Fig. 5 is a section on line 5—5 of Fig. 2, showing the relation of one of the lens retaining spring washers to a pair of assembled semi-cylindrical members.

Fig. 6 is an enlarged fragmentary detail of a preferred form of tube guiding and engaging rib, and Fig. 7 is a diagrammatical sectional view showing a portion of a lens mount constructed in accordance with another embodiment of my invention.

In order to provide a lens mount into which the various elements which go to make up an objective can be readily assembled, I have provided two or more semi-cylindrical members which are preferably identical in size and shape and which are preferably made by die-casting. It has been found that such parts can be readily made to a tolerance of plus or minus $1/1000$ of an inch and that in cases where the space of the various lenses need to be closer than this to form the best image, it is possible, by means of shims or by means of machine operations, to provide lens locating walls which are quite as accurate as the threaded and shouldered lens locating members now used in tubular type of lens supports.

In accordance with a preferred embodiment of my invention, I prefer to provide two semi-cylindrical members 1, as shown in Fig. 3, these members being identical in shape and being provided with a series of grooves 2, 3 and 4 for the reception of lens elements 5, 6 and 7, each one of these arcuate-shaped grooves including a lens locating wall.

The lens locating wall of groove 2 is the flange or shoulder 8 which extends at an angle to the axis A of the semi-cylindrical member. The lens locating wall of groove 3 is the shoulder 9 and the lens locating wall of groove 4 is the shoulder 10. It is immaterial which particular wall of the semi-cylindrical member is used as a lens locating wall except that these walls, of course, have to be positioned with the utmost accuracy.

In addition to the grooves 2, 3, and 4 for holding the lenses 5, 6 and 7, I also provide a groove 11 for the reception of a diaphragm designated broadly as 12.

This diaphragm may be self-contained and may consist of a ring 13, L-shaped in cross-section, pivotally carrying on studs 14 one end of diaphragm leaves 15, the other end of these diaphragm leaves including studs 16, riding in the slots 17 of a ring 13, forming the other portion of the diaphragm. Such diaphragms in themselves are well known, since they have usually been built directly into shutters or objectives. In the present instance, I propose to build these diaphragms as separate units.

Extending outwardly from the ring 13 is an arm 19, which, as best shown in Fig. 2, is threaded at 20.

It should be noted from Fig. 2 that the end of the arm 19 extends into the open space 21 surrounding the semi-cylindrical member 1 but does not extend out as far as the flanges 22 or the webs 23 which are so positioned that they form part walls on the exteriors of the semi-cylindrical members which are substantially cylindrical in shape.

From Fig. 4 it will be noted that the webs 23 and the flange 22 closely fit an outside cylindrical member 24 so that when the parts are properly assembled, they may be forced into the cylindrical member 24 to be definitely held in their assembled position.

I prefer to form slightly pointed edges 25 on the web members 23 although this is not necessary because it facilitates guiding the parts into place and it assists in holding the semi-cylindrical members in a fixed position when they have been pressed into the cylindrical member 24.

Member 24 is threaded to a lens ring 250 having usual screw holes 26 so that the objective may be attached to a lens board in the usual manner.

The cylindrical member 24 is preferably provided with a slot 27 so that a nut 28 may be passed through the slot and attached to the threaded portion 20 of the diaphragm adjusting arm 19. This forms a handle for operating the diaphragm.

The lenses 5, 6 and 7 may be definitely held against the locating shoulders in the semi-cylindrical members by means of spring washers 30, best shown in Fig. 5, these washers being dish-shaped as shown in Fig. 2 and being provided with a series of spring fingers 31 which are here shown as engaging one surface of the lens element. These washers are preferably located in separate grooves from the lens holding grooves and, accordingly, I have provided in the semi-cylindrical member shown in Fig. 3, a groove 32 for holding a lens in the groove 2, groove 33 for holding a lens in the groove 3 and groove 34 for holding the lens in the groove 4.

In assembling the objective shown in the drawing, a semi-cylindrical member 1 is selected and the lenses 5, 6 and 7 are placed in the arcuate grooves 2, 3 and 4. The spring washers 30, all of which are alike except for size, are then slipped into their respective grooves 32, 33 and 34, preferably when the spring fingers 31 are resting against one surface of the lens. While I have found this is generally preferable, the spring washers also work satisfactorily when the smooth periphery of the washer contacts with the lens and the spring fingers contact with their locating grooves.

After assembling the lens elements in one of the semi-cylindrical members, the diaphragm 12 is placed in the groove 11 in such a manner that a protuberance 35 on the diaphragm will enter one of the notches 36 in the semi-cylindrical members so that the diaphragm may be located with the arm 19 opposite the position which will be occupied by the slot 27 after the objective is completely assembled.

A second semi-cylindrical element is then placed over the first one, the lenses, washers and diaphragm registering with the arcuate grooves of the second member because of their positioning by the first member. The lugs 41 of the semi-cylindrical members are then seated in the apertures 42 of the other semi-cylindrical members as shown in Fig. 5 and the parts are then ready to be slipped into the hollow member which is approximately complemental in shape to the outside edges of the fins 23 and the flange 22. Thus, when the parts are forced into the cylindrical member 24, the sharpened edges 25 of the fins may slightly bite into the metal of the cylindrical member 24, as shown in Fig. 6, as the assembled parts are forced into the cylindrical member 24. These parts may be forced in until an outer flange 45 strikes the end 46 of the cylindrical member 24, in which position the diaphragm lever 20 will lie beneath the slot 27. It is then only necessary to screw on the nut 28 which is so shaped that a portion projects through the slot for operating the diaphragm in the usual manner. The diaphragm, of course, cannot turn because of the engagement of the lug 35 with the aperture 36.

The front of the semi-cylindrical members 30 may be corrugated as at 47 for the sake of appearance.

While I have described and illustrated an objective of the Cooke type, comprising a front positive element 5, a center negative element 6 and a rear positive element 7, it is to be understood that this is by way of example only and the semi-cylindrical members may be made with a sufficient number of arcuate grooves to take care of any number of elements which may be required for the particular objective being mounted.

I have also described the semi-cylindrical members as being identical in shape and as preferably being made of only two parts. This, however, is not essential. As indicated in Fig. 7, semi-cylindrical members 81, 82 and 83 may be made similar in shape with outstanding fins 84 which are all similar to each other and which may have a forced fit with an outer tubular member 85. Where the semi-cylindrical members are formed in three parts, it is somewhat simpler from the standpoint of die-castings and the tools required for the castings, although such a mount is a little more difficult to assemble.

However, it will be clear from the above description that after the parts have once been made with the desired degree of accuracy, it is not difficult to assemble the various elements forming the objective, nor does this require highly skilled help. After the semi-cylindrical elements are assembled with the lenses and, if desired, with the diaphragm in the proper locations, these parts may be pressed into the outer cylindrical member with which they have a press fit so that they are held assembled purely through their frictional contact. This frictional contact is, of course, considerable, and I find it usually best to force the semi-cylindrical members into their holding sleeve by means of a press so that they will be definitely held in place. However, my lens mount has this advantage—that if it should be desirable to repair or clean the lenses or diaphragm, it is possible to have the semi-cylindrical members pressed out again at the factory so that the necessary work can be done, after which the semi-cylindrical members with their assembled parts can be again pressed into the complementary shaped member which holds them.

While I have described the outer hollow holding member as preferably being cylindrical because such tubes of the required accuracy are relatively inexpensive, I do not intend to confine myself to a cylindrical shape since any hollow outside member which is complementary in shape to the assembled cylindrical members will be all that is required to properly hold the lens elements in position.

I claim:

1. A lens mount for photographic objectives comprising a pair of similarly shaped semi-cylindrical members assembled into a tubular lens mount, similar matching grooves in each member of arcuate shape forming cylindrical grooves in the lens mount for supporting lenses, each groove including a wall at an angle to the axis of the lens mount for determining the position of a lens, means including a spring washer for holding a lens surface against said lens locating wall, each of the semi-cylindrical members including similarly positioned engaging members carried on outside walls, and a hollow member substantially complemental in shape to the engaging members carried on the outside walls of the semi-cylindrical members whereby the latter may be held in frictional engagement by the outside member by telescoping the semi-cylindrical members thereinto.

2. A lens mount for photographic objectives comprising a pair of similarly shaped semi-cylindrical members assembled into a tubular lens mount, similar matching grooves in each member of arcuate shape forming cylindrical grooves in the lens mount for supporting lenses, each groove including a wall at an angle to the axis of the lens mount for determining the position of a lens, means including a spring washer positioned and arranged for holding a lens surface against said lens locating wall, each of the semi-cylindrical members including at least parts of outside walls of substantially cylindrical shape, and a tubular member adapted to telescope said semi-cylindrical members for holding the parts in an assembled relation.

3. A lens mount for photographic objectives comprising a pair of similarly shaped semi-cylindrical members assembled into a tubular lens mount, similar matching grooves in each member of arcuate shape forming cylindrical grooves in the lens mount for supporting lenses, each groove including a wall at an angle to the axis of the lens mount for determining the position of a lens, means including a spring washer positioned and arranged for holding a lens surface against said lens locating wall, each of the semi-cylindrical members including at least parts of outside walls of substantially cylindrical shape, and a tubular member having a press fit with said parts of the outside walls of the semi-cylindrical members.

4. A lens mount for photographic objectives comprising a pair of similar semi-cylindrical members assembled into a tubular mount, each member including matching arcuate grooves forming cylindrical shaped grooves in the lens mount adapted to position lenses, similar shaped grooves adjacent the lens positioning grooves to receive lens retaining spring washers, spaced areas on the outsides of the semi-cylindrical members having substantially cylindrical surfaces, and a tubular member having engagement with said surfaces for holding and retaining the two semi-cylindrical members in assembled position.

5. A lens mount for photographic objectives comprising a pair of similar semi-cylindrical members assembled into a tubular mount, each member including matching arcuate grooves forming cylindrical shaped grooves in the lens mount adapted to position lenses, similar shaped grooves adjacent the lens positioning grooves to receive lens retaining spring washers, spaced areas on the outsides of the semi-cylindrical members having substantially cylindrical surfaces, and a tubular member having engagement with said surfaces for holding and retaining the two semi-cylindrical members in assembled position said cylindrical surfaces including slightly raised areas adapted to be forced into the said tubular member and forming a tight connection therewith.

6. A lens mount for photographic objectives comprising a pair of similar semi-cylindrical members assembled into a tubular mount, each member including matching arcuate grooves forming cylindrical shaped grooves in the tubular lens mount adapted to position lenses, similar shaped grooves adjacent the lens positioning grooves to receive lens retaining spring washers, spaced areas on the outsides of the semi-cylindrical members having substantially cylindrical surfaces, and a tubular member having engagement with said surfaces for holding and retaining the two semi-cylindrical members in assembled position said cylindrical surfaces including slightly raised areas adapted to be forced into the said tubular member and forming a tight connection therewith, said cylindrical surfaces including at least one pointed rib projecting only slightly from said surfaces and extending parallel to the axis thereof adapted to be forced into the metal of the tubular supporting member.

7. A photographic objective comprising a pair of similar semi-cylindrical members forming between them a cylindrical lens tube, grooves of cylindrical shape formed in the lens tube, a wall in each groove for locating a lens element, a number of lens elements each engaging a lens locating wall, a spring washer positioned and arranged for holding each lens against its locating wall, at least portions of the semi-cylindrical members including substantially cylindrical areas on the outside of the lens tube, and a complementary shaped tubular member tightly engaging the outside of the semi-cylindrical members and holding them together with the lenses and washers in assembled position.

8. A photographic objective comprising a pair of similar semi-cylindrical members forming between them a cylindrical lens tube, grooves of cylindrical shape formed in the lens tube, a wall in each groove for locating a lens element, a number of lens elements each engaging a lens locating wall, a spring washer for holding each lens against its locating wall, a cylindrical groove in the lens tube, a diaphragm seated in said groove, at least portions of the semi-cylindrical members including substantially cylindrical areas on the outside of the lens tube, and a complementary shaped tubular member tightly engaging the outside walls of the semi-cylindrical members and holding them together with the lenses, diaphragm and washers in assembled position.

9. A photographic objective comprising a pair of similar semi-cylindrical members forming between them a cylindrical lens tube, grooves of cylindrical shape formed in the lens tube, a wall in each groove for locating a lens element, a number of lens elements each engaging a lens locating wall, a spring washer for holding each lens against its locating wall, a groove in the lens tube including a slot through the tube, a diaphragm seated in the slot, a diaphragm operating lever extending through the slot, portions of the outside walls of the lens tube extending outwardly beyond the slot to leave a recess in the outer wall thereof, and a tubular outer member closely fitting the outwardly extending outside walls of the lens mount and holding the semi-cylindrical members thereof together with the lenses and diaphragm in assembled relation.

10. A photographic objective comprising a pair of similar semi-cylindrical members forming between them a cylindrical lens tube, grooves of cylindrical shape formed in the lens tube, a wall in each groove for locating a lens element, a number of lens elements each engaging a lens locating wall, a spring washer for holding each lens against its locating wall, a groove in the lens tube including a slot through the tube, a diaphragm seated in the slot, a diaphragm operating lever extending through the slot, portions of the outside walls of the lens tube extending outwardly beyond the slot to leave a recess in the outer wall thereof, and a tubular outer member closely fitting the outwardly extending outside walls of the lens mount and holding the semi-cylindrical members thereof together with the lenses and diaphragm in assembled relation, a slot extending through the outside tubular member, a movable arm extending through the slot and operatively engaging the diaphragm adjusting lever for moving the same from the outside of the lens mount.

11. In a lens mount for photographic objectives comprising a number of semi-cylindrical parts each including curved inner walls and outer wall of similar shape, accurately formed, flat substantially radially arranged flanges on each part, the shape of the flange on one part being complemental to the shape of the flange on the interfitting part, accurately formed edge walls carried by each part, similarly located members on each part positioned to locate the lens elements of the objective both axially and longitudinally of the lens mount, a lens tube closely fitting the accurately formed edge walls carried by the parts for holding the parts accurately positioned with the flat substantially radially arranged flanges in contact.

12. In a lens mount for photographic objective comprising a number of semi-cylindrical parts each including curved inner walls and outer walls of similar shape, accurately formed, flat substantially radially arranged flanges on each part, the shape of the flange on one part being complemental to the shape of the flange on the interfitting part, accurately formed edge walls carried by each part, and all edge walls extending outwardly from the parts and ending in a position substantially concentric with the parts, similarly located members on each part positioned to locate the lens elements of the objective both axially and longitudinally of the lens mount, a cylindrical lens tube closely fitting the accurately formed edge walls carried by the parts for holding the parts accurately positioned with the flat substantially radially arranged flanges in contact.

D'ARCY A. YOUNG, Jr.